(12) United States Patent
Watanabe et al.

(10) Patent No.: US 7,336,006 B2
(45) Date of Patent: Feb. 26, 2008

(54) MAGNETIC ACTUATOR WITH REDUCED MAGNETIC FLUX LEAKAGE AND HAPTIC SENSE PRESENTING DEVICE

(75) Inventors: Yoichi Watanabe, Ashigarakami-gun (JP); Kazuyuki Tsukamoto, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 497 days.

(21) Appl. No.: 10/385,512

(22) Filed: Mar. 12, 2003

(65) Prior Publication Data
US 2004/0059245 A1  Mar. 25, 2004

(30) Foreign Application Priority Data

Sep. 19, 2002 (JP) .............................. 2002-273575
Sep. 20, 2002 (JP) .............................. 2002-275994

(51) Int. Cl.
H02K 41/00 (2006.01)
G06F 3/033 (2006.01)
A63F 13/02 (2006.01)
G05G 9/047 (2006.01)
G09G 5/08 (2006.01)

(52) U.S. Cl. .................... 310/12; 345/161; 74/471 XY
(58) Field of Classification Search ................ 310/13, 310/14, 24, 156.32, 154.06, 154.25, 154.45; 600/552
See application file for complete search history.

(56) References Cited

U.S. PATENT DOCUMENTS 3,096,455 A * 7/1963 Hahn ........................ 310/268
3,558,947 A * 1/1971 Burr ....................... 310/154.06
3,967,146 A * 6/1976 Howard ........................ 310/80
4,535,260 A * 8/1985 Pritchard et al. ............. 310/12
4,618,789 A * 10/1986 Flisikowski ................... 310/13
5,486,965 A    1/1996 Yoshida et al.
5,808,381 A * 9/1998 Aoyama et al. ............... 310/12
5,825,308 A * 10/1998 Rosenberg ..................... 341/20
6,064,135 A * 5/2000 Hahn ........................... 310/268
6,157,099 A * 12/2000 Hartman ....................... 310/13
6,320,284 B1 * 11/2001 Fontana et al. ............... 310/12
6,549,380 B2 * 4/2003 Kazmierczak ............ 360/264.8
6,747,631 B1 * 6/2004 Sakamaki et al. .......... 345/157
6,903,721 B2 * 6/2005 Braun et al. ................ 345/156
2002/0030664 A1 * 3/2002 Schena et al. .............. 345/163
2002/0048253 A1 * 4/2002 Chang ......................... 369/244
2002/0113498 A1 * 8/2002 Emoto .......................... 310/12
2002/0195890 A1 * 12/2002 Sun .............................. 310/81
2003/0127916 A1 * 7/2003 Godkin ......................... 310/12

FOREIGN PATENT DOCUMENTS

| CN | 1094177 A | 10/1994 |
| JP | 4-229062 A | 8/1992 |
| JP | 05-0336730 | 12/1993 |
| JP | U-06-011163 | 2/1994 |
| JP | 2000-330688 | 11/2000 |
| JP | A 2000-330688 | 11/2000 |
| JP | 2001-1217183 | 8/2001 |

* cited by examiner

*Primary Examiner*—Burton Mullins
(74) *Attorney, Agent, or Firm*—Oliff & Berridge PLC

(57) ABSTRACT

A magnetic actuator, comprising a magnet, mutually opposite magnetic poles thereof being arranged opposing each other, and a coil, at least one portion thereof being inserted between the corresponding magnetic poles, wherein a driving force for the coil is generated by applying an electric current to the coil in a magnetic field generated by the magnet.

10 Claims, 19 Drawing Sheets

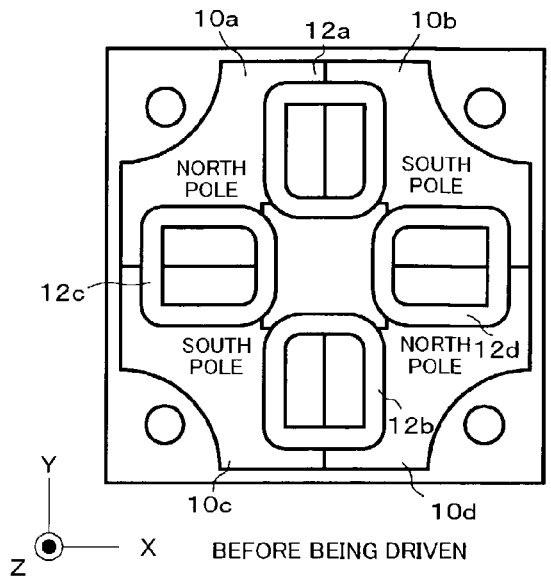
Fig. 3A — BEFORE BEING DRIVEN
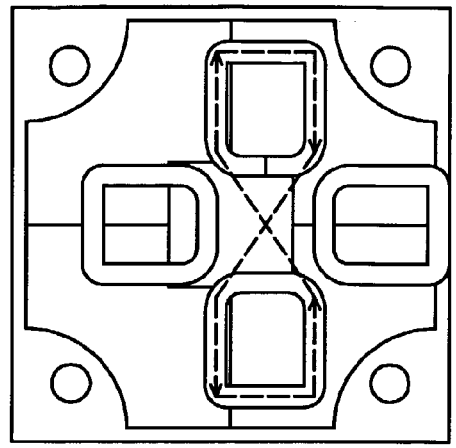
Fig. 3B — DRIVE TOWARD X-DIRECTION
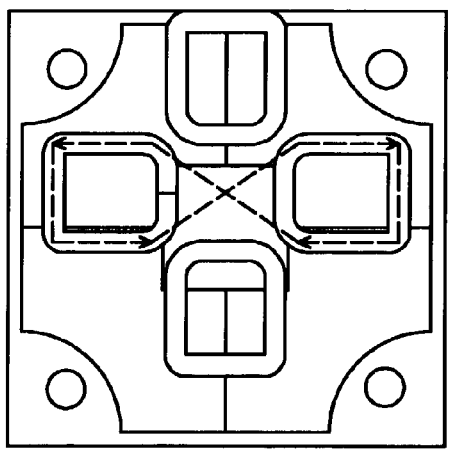
Fig. 3C — DRIVE TOWARD Y-DIRECTION
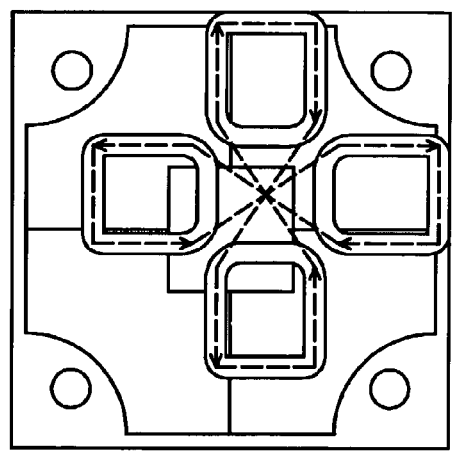
Fig. 3D — DRIVE TOWARD X-Y DIRECTION

MAGNETIC ACTUATOR WITH REDUCED MAGNETIC FLUX LEAKAGE AND HAPTIC SENSE PRESENTING DEVICE

BACKGROUND OF THE INVENTION

1. Field of the Invention

The present invention relates to a magnetic actuator and a haptic sense presenting device which enable reduced leakage of magnetic flux to the outside and can be operated in a stabilized manner.

2. Description of the Related Art

Recently, a magnetic actuator utilizing an electromagnetic interaction as a driving force has been widely used. For example, with the development of information transfer devices, a means for transmitting information through a haptic sense is needed in addition to a visual sense and an auditory sense, and a haptic sense presenting device incorporating a compact magnetic actuator into a pointing device such as a mouse or the like and capable of giving vibration to a fingertip has been realized.

A haptic sense presenting device incorporating a magnetic actuator has been disclosed in Japanese Patent Laid-Open Publication No. 2000-330688. As shown in FIG. 16A, a haptic sense presenting device is provided with a magnetic actuator in a pointing device 100, and a transmitting unit 18 is provided connected with the magnetic actuator. When in use, as shown in FIG. 16B, vibration from the magnetic actuator can be transmitted to a fingertip by keeping the fingertip in contact with the transmitting unit 18.

FIGS. 17 and 18 show a side view of the magnetic actuator incorporated in the haptic sense presenting device and an exploded perspective view of the major portion thereof, respectively.

The magnetic actuator comprises, as shown in FIG. 17, a magnet array 10, a plane coil 12, yoke plates 14a and 14b, a stud 16, a transmitting unit 18, a sliding unit 20, and a connecting unit 22. As shown in FIG. 18, the magnet array 10 comprises magnets 10a to 10d, and the plane coil 12 comprises plane coils 12a to 12d.

The magnets 10a to 10d are juxtaposed on the yoke plate 14a with opposite polarity alternately directed. The plane coils 12a to 12d are kept away from the magnets 10a to 10d by a predetermined gap, respectively, and arranged so as to straddle a plurality of magnets, respectively. The yoke plate 14b is provided so as to cover the plane coil 12. Span between the yoke plate 14a and the yoke plate 14b is supported by the studs 16 so as to keep a fixed interval.

The transmitting unit 18 is, as shown in FIG. 17, concurrently coupled with each of the plane coils 12a to 12d via the connecting unit 22. On the other hand, the transmitting unit 18 is also relatively slidably coupled to an outer member 26 by the sliding unit 20.

Between the yoke plate 14a and the yoke plate 14b, a magnetic field is generated by the magnets 10a to 10d. In the magnetic field, an electromagnetic force is generated for the plane coils 12a to 12d by applying an electric current to the plane coils 12a to 12d, thereby driving the transmitting unit 18. For example, as shown in FIG. 18, when north poles and south poles of the magnets 10a to 10d are arranged facing in the Z axis direction and the plane coil 12 is provided within the X-Y plane, a driving force can be generated within the X-Y plane.

The magnetic actuator incorporated in such a pointing device or the like is required to be as compact as possible, while its operable range is desired to be as large as possible. Moreover, in order to obtain the largest possible driving force for the size, it is necessary to prevent leakage of the magnetic flux to the outside and to increase the interaction between the magnetic field and a coil current. Furthermore, in order to avoid effects on outside equipment (for example, a display, a magnetic card, or the like), leakage of the magnetic field from the magnet in the magnetic actuator to the outside needs to be sufficiently suppressed.

However, the above-described conventional magnetic actuator has the following problems.

(A) In the upper and the lower parts of the magnetic actuator, the magnetic field leaked to the outside is restricted because the magnetic field is cut off by the yoke plates 14a and 14b. However, a yoke cannot be provided on the side of the magnetic actuator, because the members avoid interfering with one another when the plane coil 12 is moved, which means that leakage of the magnetic field from the side to the outside is larger than that from the upper and the lower parts thereof. Therefore, a magnetic field effective for generating a driving force is reduced and an effect on outside equipment is increased. Moreover, when the plane coil 12 moves further away from the center of the magnetic actuator, it is more susceptible to the influence of the reduction of the magnetic field due to the leakage of the magnetic flux from the side of the magnetic actuator, and a sufficient driving force cannot be obtained.

(B) When a yoke is provided on the whole area of the side of a magnetic actuator in order to avoid the above-described problem (A), the magnetic actuator itself must be made larger in order to obtain the operable range equal to the conventional one, thus a requirement for making it smaller in size and lighter in weight cannot be satisfied.

(C) In a magnetic actuator, when a plane coil 12 is moved to the vicinity of an end of a magnet 10, as shown in FIG. 19, one side of the plane coil 12 comes closer to the vicinity of the boundary of two magnets. In the vicinity of the boundary of the neighboring magnets, a north pole of the magnet is very close to a south pole of the magnet, and therefore a horizontal magnetic field directing from a north pole to a south pole is generated. The magnetic field causes a driving force in a direction straying away from the intrinsically required driving force toward the in-plane direction of the plane coil 12, as shown in FIG. 19.

Accordingly, when the plane coil 12 comes closer to the vicinity of the boundary of the magnets, a problem is caused that the plane coil 12 is tilted, or the plane coil 12 is further entangled with another member. Specifically, when the plane coil 12 is moved to the ends of the magnetic actuator in the X and the Y directions, a problem is caused that a driving force is generated substantially in the vertical direction for all the plane coils 12.

SUMMARY OF THE INVENTION

In view of the above-described problems of the related art, the present invention is conceived to provide a magnetic actuator and a haptic sense presenting device which can reduce leakage of the magnetic field from the side thereof and operate in the entirety of the operable range in a stabilized manner while maintaining the size and the weight thereof at the same level as the related art.

The above-described problems have been successfully solved by employing configurations described hereinafter.

In order to solve the above-described problems, the present invention provides a magnetic actuator comprising a magnet having mutually opposite magnetic poles being arranged opposing each other, and a coil, at least one portion thereof being inserted between the corresponding magnetic poles, wherein a driving force for the corresponding coil is obtained by applying an electric current to the coil in a magnetic field generated by the magnet.

Furthermore, in order to solve the above-described problems, the present invention provides a haptic sense presenting device for giving a stimulus to a haptic sense of an animal by vibration, characterized in that the haptic sense presenting device comprises a magnetic actuator comprising a magnet, mutually opposite magnetic poles thereof being arranged opposing each other, and a coil, at least one portion thereof being inserted between the corresponding magnetic poles, wherein a driving force for the corresponding coil is obtained by applying an electric current to the coil in a magnetic field generated by the magnet.

In order to achieve an advantage, a magnetic actuator according to the present invention is characterized in comprising a substantially flat-plate shaped first yoke plate having a first surface and a second surface, a substantially flat-plate shaped second yoke plate having a third surface and a fourth surface, wherein the third surface is provided so as to oppose the second surface of the first yoke plate, a plurality of magnets provided fixed to the second surface of the first yoke plate, a plurality of coils provided in parallel with the third surface of the second yoke plate between the plurality of magnets and the second yoke plate, a connecting unit for integrally fixing the plurality of coils, and a magnetic shielding unit comprising a magnetic substance provided on both or either of peripheries of the second surface of the first yoke plate and/or the third surface of the second yoke plate.

BRIEF DESCRIPTION OF THE DRAWINGS

FIGS. 3A, 3B, 3C, and 3D are views respectively explaining a relationship between an electric current and a driving direction of plane coils of a magnetic actuator in one embodiment of the present invention;

DESCRIPTION OF THE PREFERRED EMBODIMENT

Hereinafter, a magnetic actuator in one embodiment of the present invention will be described in detail with comparative example to the drawings.

First Embodiment

Figure 1:
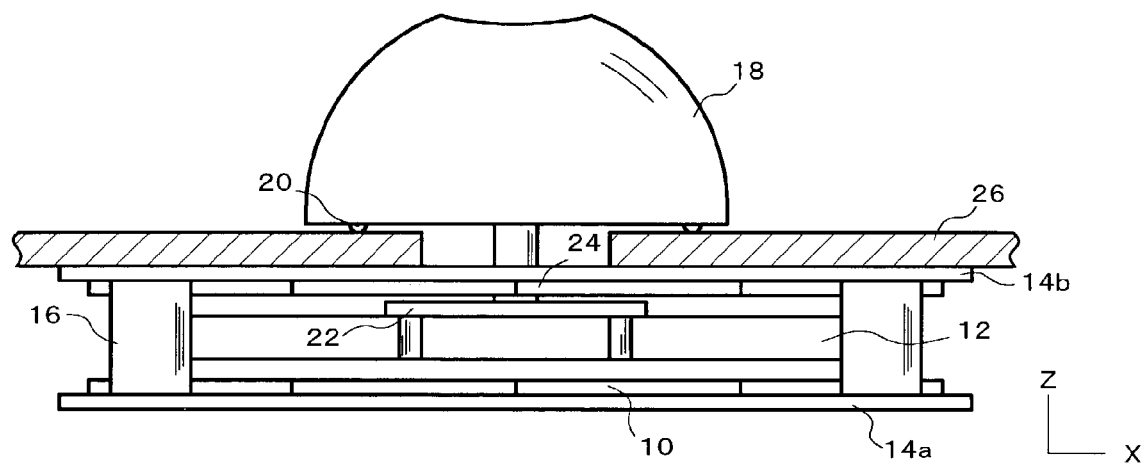
FIG. 1 is a side view showing a configuration of a magnetic actuator in one embodiment of the present invention.
Figure 2:
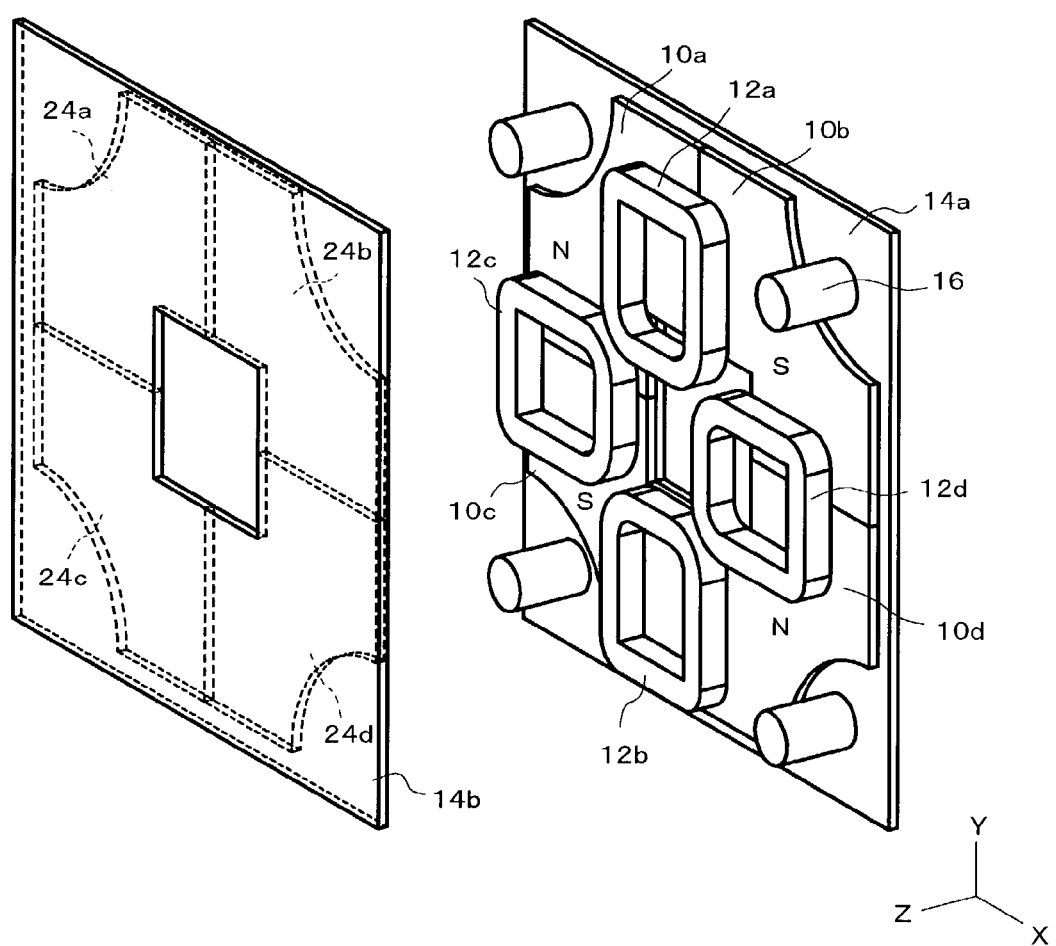
FIG. 2 is an exploded perspective view of the major portion of a magnetic actuator in one embodiment of the present invention.

FIGS. 1 and 2 show a side view of a magnetic actuator in one embodiment of the present invention and an exploded perspective view of the major portion thereof, respectively.

The magnetic actuator according to the present embodiment basically comprises magnet arrays 10 and 24, a plane coil 12, yoke plates 14a and 14b, studs 16, a transmitting unit 18, a sliding unit 20, and a connecting unit 22, as shown in FIG. 1. The magnet arrays 10 and 24 comprise, as shown in FIG. 2, four magnets 10a to 10d, and 24a to 24d, respectively. The plane coil 12 comprises four plane coils 12a to 12d. The magnetic actuator according to the present embodiment is characterized in that the magnets 24a to 24d are newly provided also on an upper yoke plate 14b in addition to the magnets 10a to 10d provided on a lower yoke plate 14a.

The magnets 10a to 10d are juxtaposed on the lower yoke plate 14a with opposite magnetic poles alternately directed in the Z-axis direction. For example, as shown in FIG. 2, when a north pole of the magnet 10a is arranged directing toward the inside of the magnetic actuator, a south pole of the magnet 10b, a south pole of the magnet 10c, and a north pole of the magnet 10d are arranged so as to be directed toward the inside of the magnetic actuator. In the present embodiment, although mutually individual permanent magnets are used as the magnets 10a to 10d, one magnet may be partially magnetized such that opposite magnetic poles are alternately directed.

The plane coils 12a to 12d are arranged, as shown in FIG. 1, in parallel with the magnets 10a to 10d above the magnets 10a to 10d with a predetermined gap. The plane coils 12a to 12d are relatively movably arranged relative to the magnets 10a to 10d.

Moreover, each of the plane coils 12a to 12d is arranged so as to straddle any two of the magnets 10a to 10d, respectively. For example, the plane coil 12a is arranged so as to straddle the magnets 10a and 10b toward the X-direction. Similarly, the plane coil 12b is arranged so as to straddle the magnets 10c and 10d in the X direction, the plane coil 12c is arranged so as to straddle the magnet 10a and 10c in the Y direction, and the plane coil 12d is arranged so as to straddle the magnets 10b and 10d in the Y direction.

The plane coils 12a and 12b are, as shown in FIG. 3B, connected with each other such that a common electric current runs so as to draw the numeral eight (8). The plane coils 12c and 12d are also connected with each other as shown in FIG. 3C. Operation of these coil currents will be hereinafter described in detail.

Although a copper wire is generally used for the wiring of the plane coils 12a to 12d, a material such as copper-clad aluminum or the like is preferably used in order to reduce the weight of the magnetic actuator.

The magnets 24a to 24d are fixed to the upper yoke plate 14b, as shown in FIG. 2, and arranged with a predetermined gap from the plane coils 12a to 12d so as to oppose the magnets 10a to 10d, respectively. The magnets 24a to 24d and the magnets 10a to 10d are arranged such that the magnetic poles opposing each other are opposite, respectively. For example, when a north pole of the magnet 10a is arranged directing toward the inside of the magnetic actuator, a south pole of the magnet 24a is arranged directing toward the inside of the magnetic actuator. Similarly, the magnet 10b and the magnet 24b, the magnet 10c and the magnet 24c, and the magnet 10d and the magnet 24d are arranged such that mutually opposite magnetic poles are opposed to each other. A gap between the magnet array 24 and the magnet array 10 is set at a predetermined distance, and is fixedly supported by the studs 16 connecting the upper yoke plate 14b with the lower yoke plate 14a.

The distance between the magnet array 10 and the magnet array 24 is preferably one half or less of the width of the respective magnets, and moreover, it is more preferable to be one fifth or less of the width of the respective magnets. Furthermore, when opposing surfaces of the respective magnets are not rectangular but circular or the like, the distance between the magnet array 10 and the magnet array 24 is preferably one half or less and more preferably one fifth or less of the square root of the area of the opposed surfaces.

As the magnets 10a to 10d and 24a to 24d, permanent magnets may be used. The permanent magnets may be general ferrite type magnets, but rare earth magnets such as neodymium magnets or the like, having a stronger magnetic force, are preferably used. If the weight of the magnetic actuator is not important, the same advantage as the present embodiment can also be obtained by a configuration having a coil used as an electromagnet.

The transmitting unit 18 is concurrently fixed with all the plane coils 12a to 12d with the connecting unit 22, as shown in FIG. 1. The transmitting unit 18 is also relatively movably coupled to the outer member 26 by the sliding unit 20. In other words, the transmitting unit 18 is relatively movably coupled to the magnets 10a to 10d and the magnets 24a to 24d fixed to the yoke plates 14a and 14b, respectively, in the X-Y plane. For the sliding unit 20, an elastic body such as rubber, a spring, or the like, and ball bearings, or the like, may be preferably used.

Hereinafter, movement and operation of a magnetic actuator according to the present embodiment will be described in detail with comparative example to FIGS. 3A to 3D. For simplification of the description, arrangement of only magnets 10a to 10d and plane coils 12a to 12d arranged on a lower yoke plate 14a is shown in FIGS. 3A to 3D.

Before the magnetic actuator is driven, an electric current is not applied to any of the plane coils 12a to 12d, as shown in FIG. 3A, and the center point of the plane coils 12a to 12d is maintained in the vicinity of the center of the magnetic actuator by the energizing action of the sliding unit 20.

When the magnetic actuator is driven, the electric current is applied to the plate coils 12a and 12b from an outside source (not shown) so as to draw the numeral eight (8), as shown in FIG. 3B. A driving force toward the X-direction is generated by an electromagnetic interaction between the magnetic field due to the magnets 10a to 10d and the magnets 24a to 24d (not shown) and the coil current. At this time, the transmitting unit 18 (not shown) concurrently fixed with the plane coils 12a to 12d is driven toward the X-direction together with the plane coils 12a to 12d.

Similarly, if the electric current is applied to the plane coils 12c and 12d from an outside source so as to draw the numeral eight (8), as shown in FIG. 3C, a driving force in the Y-direction is generated by an electromagnetic interaction. Accordingly, the transmitting unit 18 (not shown) is driven toward the Y-direction together with the plane coils 12a to 12d.

When the electric currents are simultaneously applied to the plane coils 12a and 12b and to the plane coils 12c and 12d, as shown in FIG. 3D, the plane coils are simultaneously moved toward the X-direction and the Y-direction in accordance with the magnitude of the electric currents for respective combinations of the plane coils.

Figure 4:
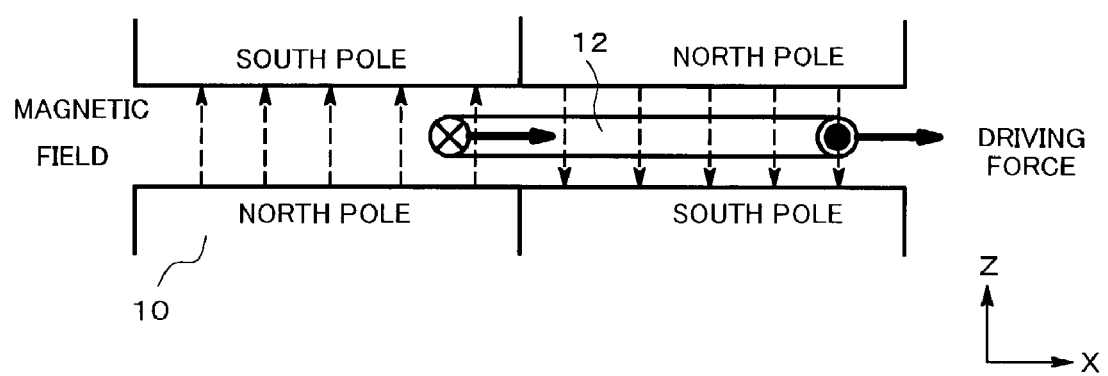
FIG. 4 is a view explaining a driving force generated in a plane coil of a magnetic actuator in one embodiment of the present invention.

In the present embodiment, at this time, magnetic fields (arrowed dotted lines) can be generated in the vertical direction relative to the X-Y plane in the entire interior of the magnetic actuator, as shown in FIG. 4, because the magnets 24a to 24d are provided in addition to the magnets 10a and 10d. Consequently, even when the plane coil 12 is driven to the vicinity of the ends of the magnets 10a to 10d and 24a to 24d, generation of a force in the vertical direction (Z-direction) to the plane coil 12 can be largely reduced. Moreover, the magnetic actuator can be driven in a stabilized manner.

Furthermore, by reducing the horizontally directed magnetic field, the intensity of the magnetic field toward the vertical direction can be simultaneously increased. As the result, a driving force in the parallel direction (X or Y direction) relative to the plane coil 12 can be increased.

Moreover, leakage of the magnetic field from the side of the magnetic actuator is reduced, because the magnetic field is directed toward the vertical direction also at the end of the magnet. As a result, an influence of the magnetic field to the outside equipment can be largely reduced.

At this time, the size and the weight of the magnetic actuator can be maintained at least at the same order as the related art by reducing the thickness of the magnets 10a to 10d as much as the thickness of the newly provided magnets 24a to 24d. Moreover, the size and the weight of the magnetic actuator can also be reduced, because the magnetic field generated by the magnets can be effectively utilized toward the vertical direction.

In the present embodiment, although the magnet array 10 and the magnet array 24 are configured with four magnets 10a to 10d and 24a to 24d, respectively, the number of the magnets is not limited thereto. For example, when the magnetic actuator is driven to only either the X-direction or the Y-direction, the magnet array 10 and the magnet array 24 are configured with two magnets, respectively, and one plane coil is arranged in the gap therebetween.

Figure 8:
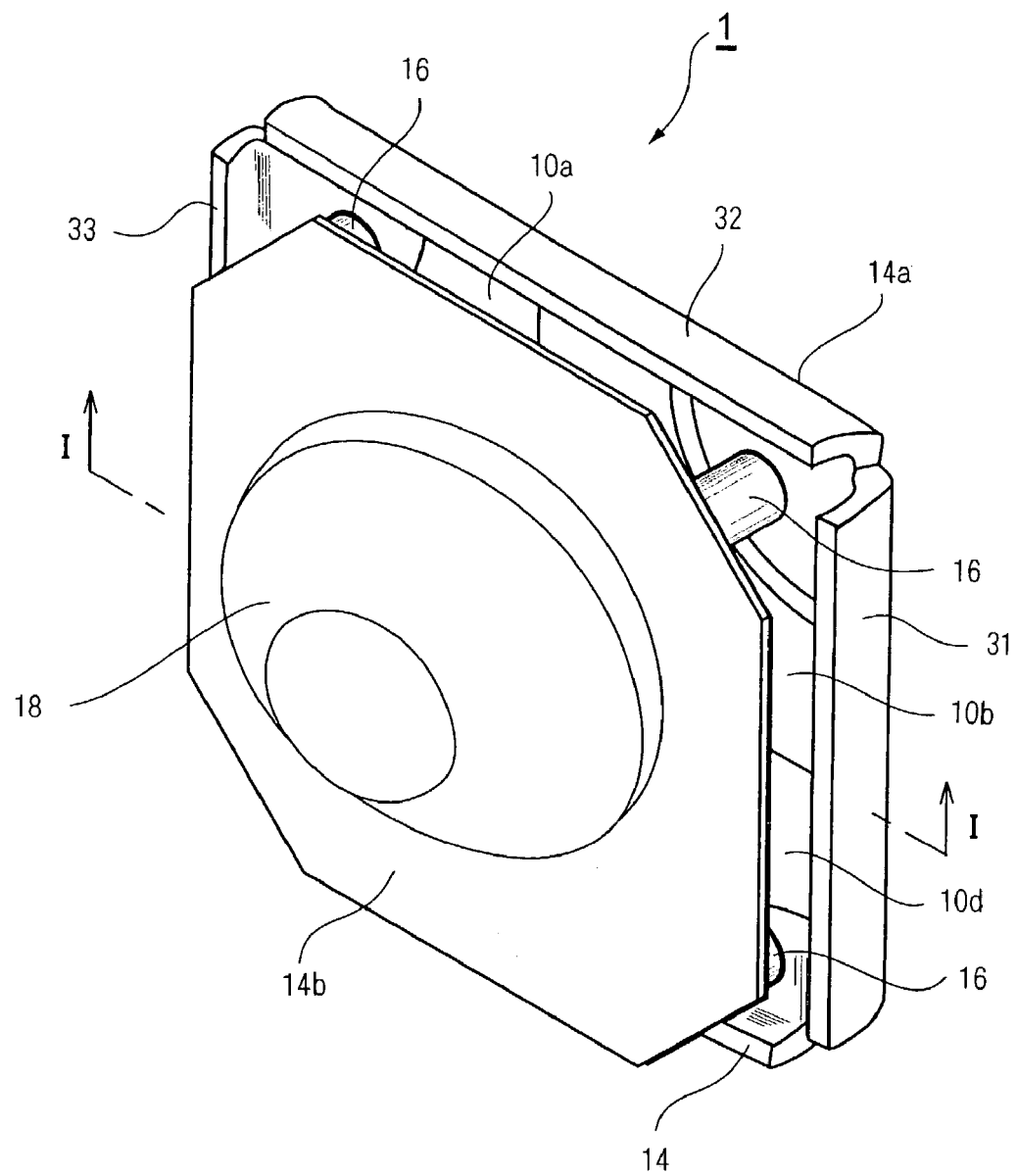
FIG. 8 is a perspective view of the whole of a magnetic actuator according to a second embodiment of the present invention.

As shown in FIG. 8, a haptic sense presenting device can be configured by incorporating a magnetic actuator according to the present embodiment into a pointing device. Here, influence of the magnetic field on another device such as a display or the like can be reduced because the leakage of the magnetic flux can be reduced. In addition, the haptic sense presenting device can also be made smaller in size because a driving force can be efficiently obtained.

COMPARATIVE EXAMPLE

Hereinafter, one comparative example along with the related art shown in FIGS. 9 and 10 will be described.

In the comparative example, yoke plates 14a and 14b are made of iron, and formed in a rectangular shape, respectively, and the lengths of respective sides thereof are suitably set in accordance with the size of the magnets. Each of the yoke plates 14a and 14b has an aperture for convenience of the configuration.

For the magnets 10a to 10d, neodymium magnets are used, and for the thickness of the yoke plates, a predetermined level is selected from a level of 1 to 10 mm, for the lengths of respective sides thereof, a predetermined level is selected from a level of 5 to 50 mm, and portions thereof where the studs 16 are provided are cut off in an arcuate manner.

The magnets 10a to 10d are arranged on the lower yoke plate 14a by adhering thereto such that the magnetic poles are alternately directed. At this case, the magnets are partially cut off so as to fit with the aperture of the yoke plate 14a.

Each of the plane coils 12a to 12d is made by winding around a substantially rectangular shape with a conductive wire a predetermined number of turns from a level of turns of 50 to 300 turns, and a predetermined level of thickness thereof is selected from a level of 1 to 5 mm. A copper wire is used for the conductive wire.

Studs 16 are provided at four corners of the yoke plates 14a and 14b, respectively, in a manner such that the yoke plates 14a and 14b are kept substantially in parallel with a predetermined gap therebetween.

The plane coils 12a to 12d are held maintaining a gap of such a size as to be capable of avoiding contact with the magnets 10a to 10d, respectively.

EXAMPLE

Hereinafter, a specific example in accordance with the above-described embodiment shown in FIGS. 1 and 2 will be described.

Here, the yoke plates 14a and 14b are made of iron, and the thickness and the length thereof are made the same as the configuration of the comparative example. Each of the yoke plates 14a and 14b is provided with a rectangular aperture for convenience of the configuration.

For the magnets 10a to 10d and the magnets 24a to 24d, neodymium magnets are used. The thickness of the yoke plate is made one half of that of the comparative example, the length for respective sides thereof is made the same as that of the comparative example, and portions where studs 16 are provided are cut off in an arcuate manner.

The magnets 10a to 10d and the magnets 24a to 24d are arranged on the lower yoke plate 14a and on the upper yoke plate 14b, respectively, by adhering thereto such that the magnetic poles are alternately directed. At this time, the magnets are partially cut off so as to fit into to the apertures of the yoke plates 14a and 14b, respectively.

The plane coils 12a to 12d used are of the same specification as the comparative example.

The studs 16 are provided at four corners of the yoke plates 14a and 14b, respectively, in a manner such that the yoke plates 14a and 14b are kept substantially in parallel with a predetermined gap therebetween.

The plane coils 12a to 12d are inserted between the magnets 10a to 10d and the magnets 24a to 24d, and held maintaining a gap of such a size as to be capable of avoiding contact with the magnets, respectively.

(Measurement of the Magnetic Flux Leaked Outside)

Figure 5:
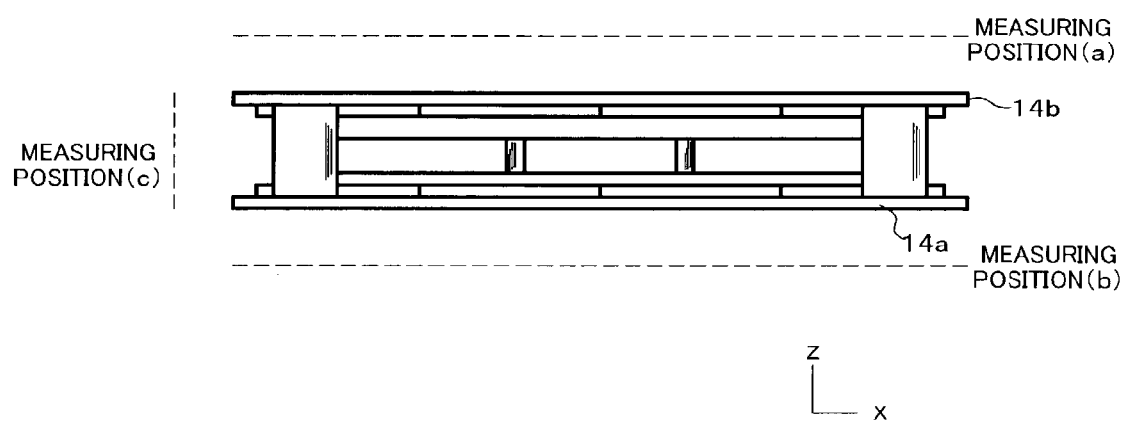
FIG. 5 is a view showing positions measuring magnetic flux leakage to the outside in one comparative example and one embodiment of the present invention.

Magnetic flux leaked outside of a magnetic actuator is measured around the above-described comparative example and the embodiment, respectively. In the measurement, the maximum magnetic flux leakage was measured at three positions of the magnetic actuator, namely, a position 5 mm away from the upper yoke plate 14b (dotted line a in FIG. 5), a position 5 mm away from the lower yoke plate 14a (dotted line b in FIG. 5), and a position 5 mm away from the side of the magnetic actuator (dotted line c in FIG. 5).

Figure 20:
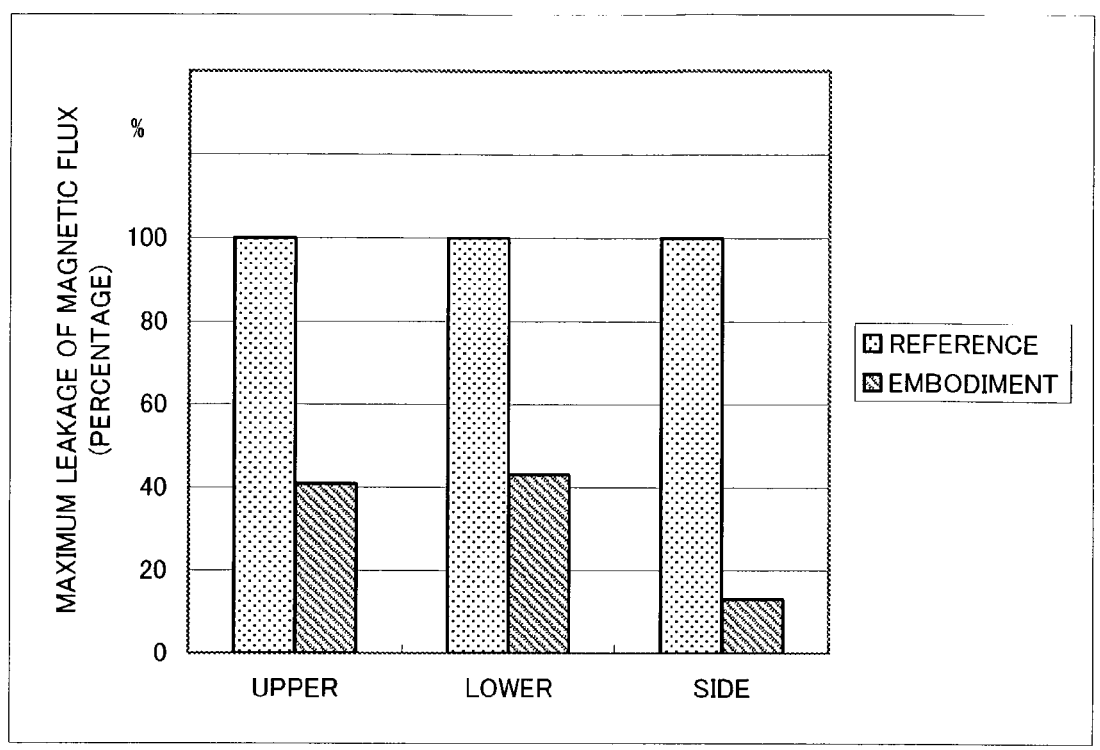
FIG. 20 shows bar graphs showing measurement results of the leakage of magnetic flux to the outside in one comparative example and one embodiment of the present invention.

Measurement results of the magnetic flux leakage at respective positions are shown in FIG. 20. In the vicinities of the upper yoke plate 14b (dotted line a in FIG. 5) and the lower yoke plate 14a (dotted line b in FIG. 5), the maximum magnetic flux leakage in the embodiment was reduced to about 40% of that of the comparative example in both cases. In the vicinity of the side of the magnetic actuator (dotted line c in FIG. 5), the maximum magnetic flux leakage in the embodiment was reduced to even about 10 to 20% of that of the comparative example, thus verifying the degree of the effect.

(Measurement of the Driving Force)

In the comparative example and the embodiment, a driving force is measured when an equal electric current is applied to the plane coils 12a and 12b, respectively, and the measurement results are shown.

Figure 6:
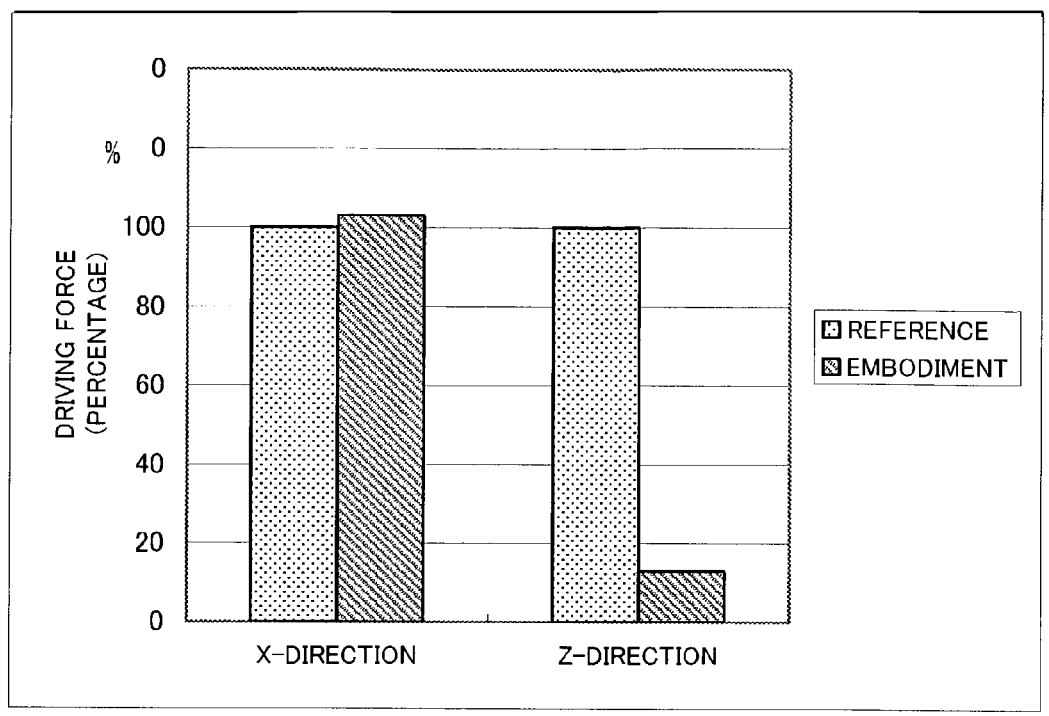
FIG. 6 shows bar graphs showing measurement results of driving forces generated in coils in one comparative example and one embodiment of the present invention.

The driving force in the parallel direction relative to the plane coil (X-direction) was increased in the embodiment compared with the comparative example as shown in FIG. 6. On the other hand, the driving force in the vertical direction relative to the plane coil (Z-direction) was drastically reduced in the embodiment compared with the comparative example as shown in FIG. 6.

Furthermore, measurement results of the driving force when the equal electric current is applied to the plane coils 12a and 12b and the plane coils 12c and 12d in the comparative example and the embodiment are shown.

Figure 7:
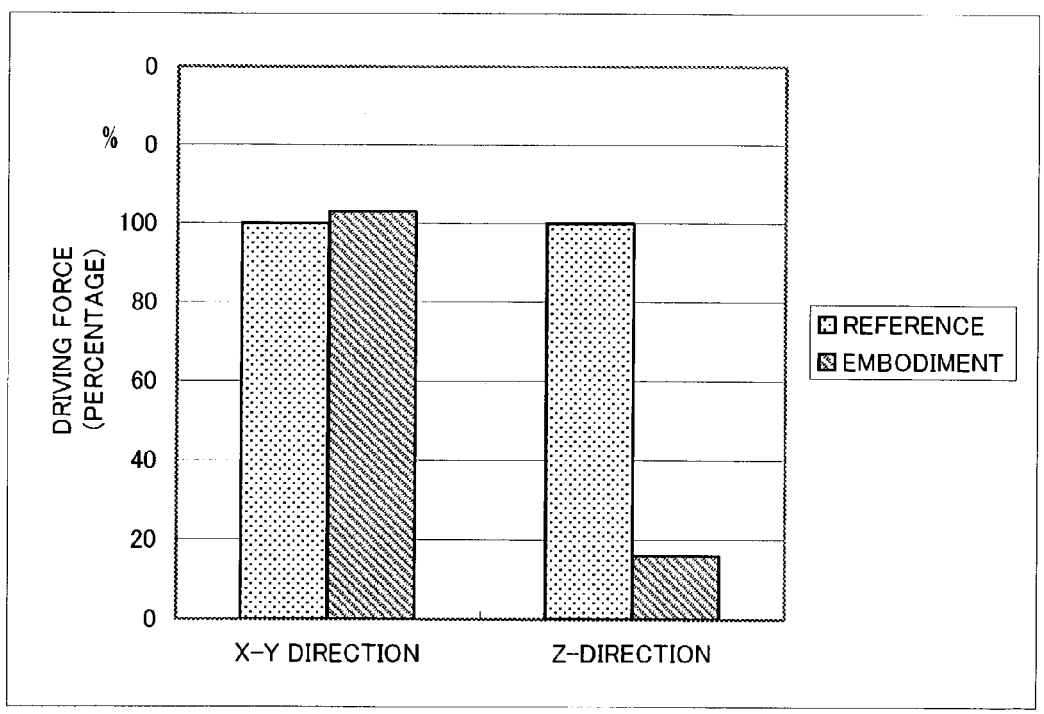
FIG. 7 shows bar graphs showing measurement results of driving forces generated in coils in one comparative example and one embodiment of the present invention.

The driving force in the horizontal direction relative to the plane coil (X-Y direction) was increased in the embodiment in comparison with the comparative example as shown in FIG. 7. On the other hand, the driving force in the vertical direction relative to the plane coil (Z-direction) was drastically reduced in the embodiment in comparison with the comparative example as shown in FIG. 7.

According to the present invention, a magnetic field can be generated in the vertical direction relative to the plane coil in the entire interior of the magnetic actuator. As the result, generation of a force in the vertical direction relative to the plane coil (Z-direction) can be largely reduced, and simultaneously the driving force in the parallel direction relative to the plane coil (X- or Y-direction) can be increased. Consequently, the magnetic actuator can be operated in a stabilized manner.

Moreover, according to the present invention, the magnetic field is directed toward the vertical direction even at the end of the magnet, and therefore the leakage of the magnetic flux from the side of the magnetic actuator can be reduced. As the result, the influence of the magnetic field on the outside equipment can be largely reduced.

In addition, according to the present invention, the above-described advantage can be obtained by maintaining the size and the weight of the magnetic actuator at the same level as the related art.

Second Embodiment

A second embodiment of a magnetic actuator according to the present invention will now be described.

Figure 9:
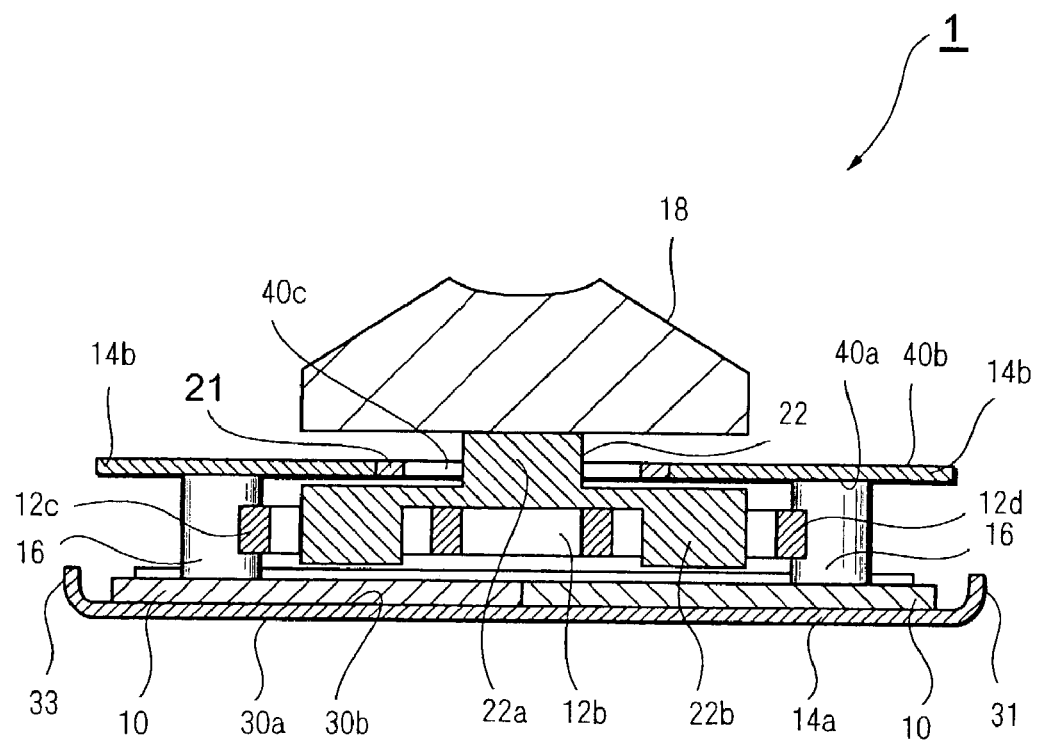
FIG. 9 is a cross-sectional side view showing an I-I cross-section of the magnetic actuator shown in FIG. 8.
Figure 10:
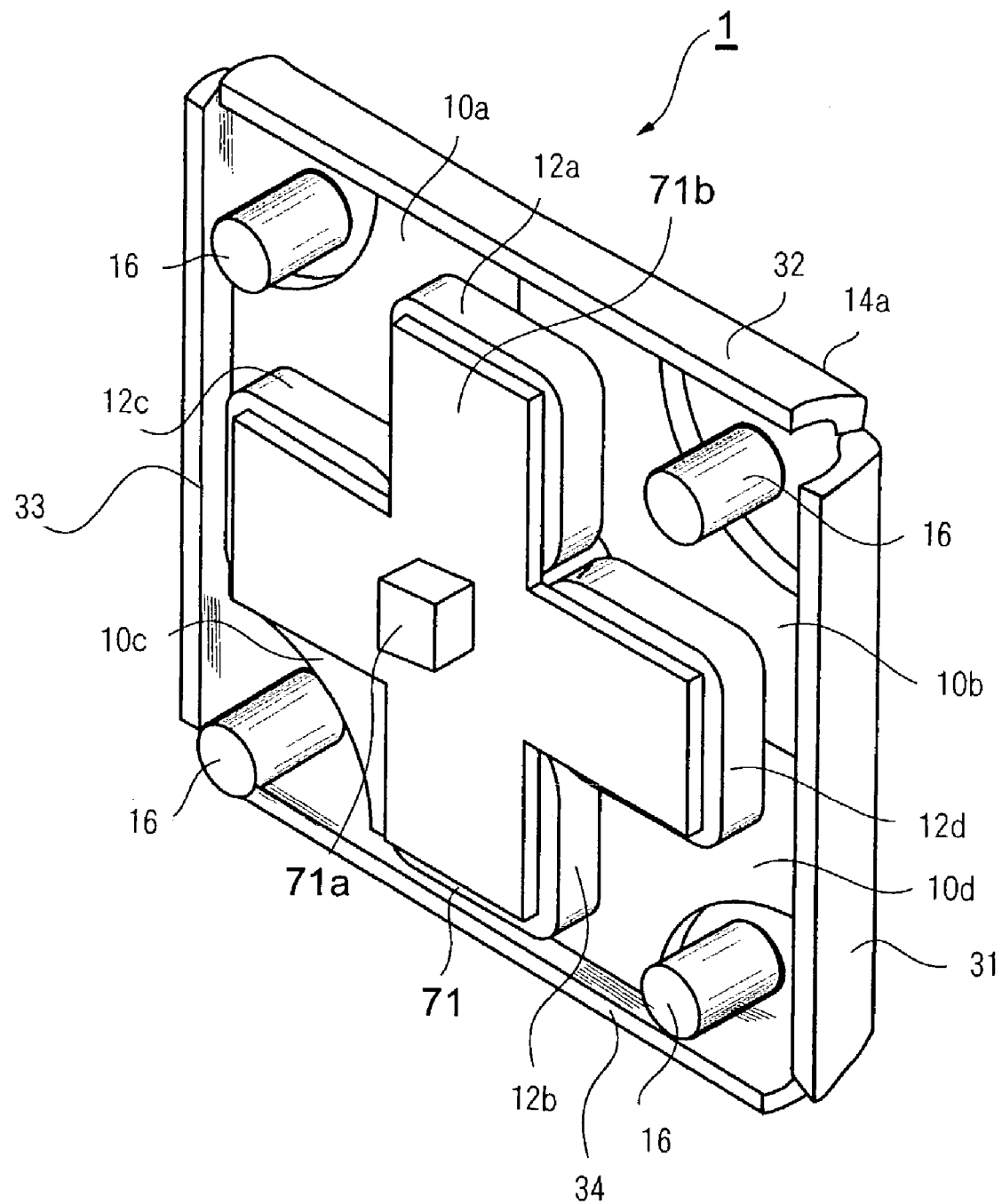
FIG. 10 is a perspective view of a magnetic actuator according to a second embodiment of the present invention with a haptic sense presenting member and a second yoke plate removed therefrom.

As shown in FIGS. 8 and 9, a magnetic actuator 1 is provided with a first yoke plate 14a and a second yoke plate 14b. The first yoke plate 14a and the second yoke plate 14b are formed with a magnetic substance. The first yoke plate 14a has the shape of a substantially square flat plate, and has a first surface 30a and a second surface 30b which is the opposite surface of the first surface 30a. The second yoke plate 14b has the shape of a substantially square flat plate with four corners obliquely cut off. The second yoke plate 14b has a third surface 40a and a fourth surface 40b which is the opposite surface of the third surface 40a. The reason why the four corners of the second yoke plate 14b are cut off is to prevent interference at the time of mounting. The first yoke plate 14a and the second yoke plate 14b are provided at positions substantially in parallel with each other such that the second surface 30b and the third surface 40a are mutually opposed, and four corners of the first and second yoke plates are respectively fixed by four studs 16. In addition, the second yoke plate 14b has an aperture 40c at a substantially central portion thereof, as shown in FIG. 9.

Moreover, the first yoke plate 14a has magnetic shielding units 31 to 34 provided thereon. The magnetic shielding units 31 to 34 are provided on peripheries of the second surface 30b of the first yoke plate 14a. In particular, the magnetic shielding units 31 to 34 are formed by bending the ends of the first yoke plate 14a toward the second surface 30b. The magnetic shielding units 31 to 34 are bent substantially at right angles relative to the first yoke plate 14a, and the height thereof from the second surface 30b of the first yoke plate 14a is formed such that the heights of the magnetic shielding units 31 to 34 are substantially equal.

The magnetic actuator 1 is also provided with a haptic sense presenting member (transmitting unit) 18 and a connecting unit 22. The connecting unit 22 is provided between the first yoke plate 14a and the second yoke plate 14b such that it can move in parallel with the third surface 40a. The connecting unit 22 is substantially in parallel with the third surface 40a and has a plate-like portion extending in two directions which mutually cross orthogonally. The connecting unit 22 also has a column unit 22a protruding in a square pillar shape so as to penetrate through an aperture 40c of the second yoke plate 14b from substantially the center of the plate-like portion. The haptic sense presenting member 18 is fixed at the end tip of the column unit 22a, and is displaceably provided on the fourth surface 40b of the second yoke plate 14b together with the connecting unit 22. The shape of the haptic sense presenting member 18 is a disk having a thick central portion.

Figure 11:
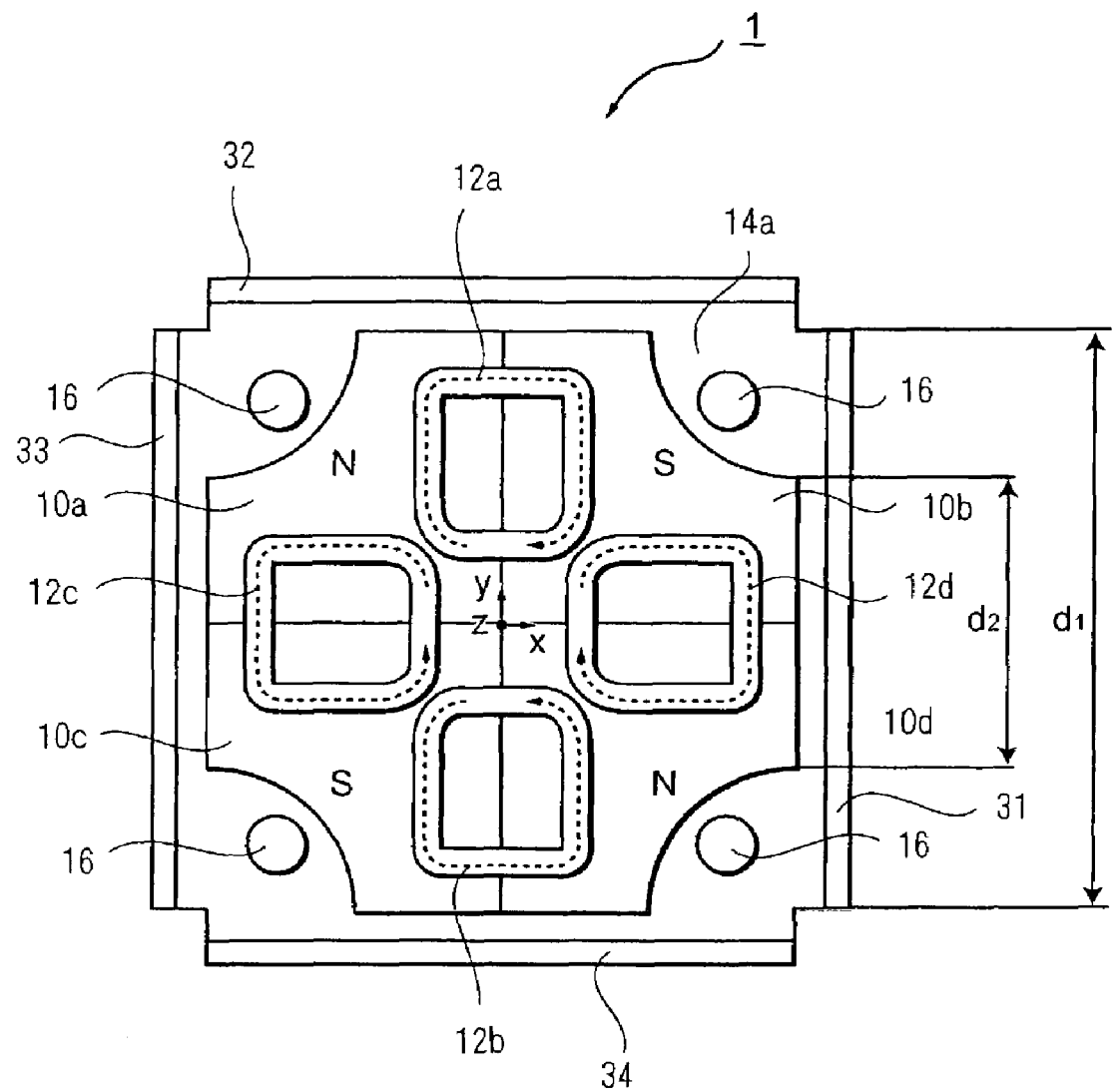
FIG. 11 is a plan view showing a positional relationship between coils and magnets of a magnetic actuator according to a second embodiment of the present invention.

FIG. 11 shows a relative positional relationship between the four magnetic shielding units 31 to 34, the four magnets 10a to 10d, and the four coils 12a to 12d. As shown in FIG. 11, an XYZ orthogonal coordinate system having the origin at the central position of the first yoke plate 14a is assumed. The X-axis and the Y-axis are in parallel with corresponding sides of the outer frame of the first yoke plate 14a, respectively.

The magnetic shielding units 31 to 34 are provided on the peripheries of the first yoke plate 14a. The magnetic shielding unit 31 and the magnetic shielding unit 33 are provided such that the longitudinal directions thereof are substantially in parallel with each other. The magnetic shielding unit 32 and the magnetic shielding unit 34 are provided such that the longitudinal directions thereof are substantially in parallel with each other and the longitudinal directions thereof are substantially at right angles to the longitudinal directions of the magnetic shielding unit 31 and the magnetic shielding unit 33. In addition, as shown in FIG. 11, the magnetic shielding unit 31 is configured such that the length $d_1$ in the longitudinal direction of the magnetic shielding unit 31 is longer than the sum $d_2$ of the lengths of the sides, closest to the magnetic shielding unit 31, respectively, of the magnet 10b and the magnet 10d. This relative configuration is the same with the magnetic shielding unit 32 and the magnets 10b and 10a, the magnetic shielding unit 33 and the magnets 10a and 10c, and the magnetic shielding unit 34 and the magnets 10c and 10d, respectively.

An electric current may be independently applied to the coils 12a to 12d, respectively. Then, in accordance with the magnitude and the direction of the electric current respectively applied to the coils 12a to 12d, an electromagnetic force is generated between the magnetic fields generated by the magnets 10a to 10d and conductive wires of the coils 12a to 12d, respectively, in accordance with Fleming's left-hand rule, and a thrust is thereby generated in the coils 12a to 12d, respectively. Then, the coils 12a to 12d and the connecting unit 22 are moved relative to the first yoke plate 14a to which the magnets 10a to 10d are fixed. By the movement of the coils 12a to 12d and the connecting unit 22, a haptic sense is presented to a fingertip or the like of an operator who is touching the haptic sense presenting member 18 fixed to the column unit 22a.

Figure 12:
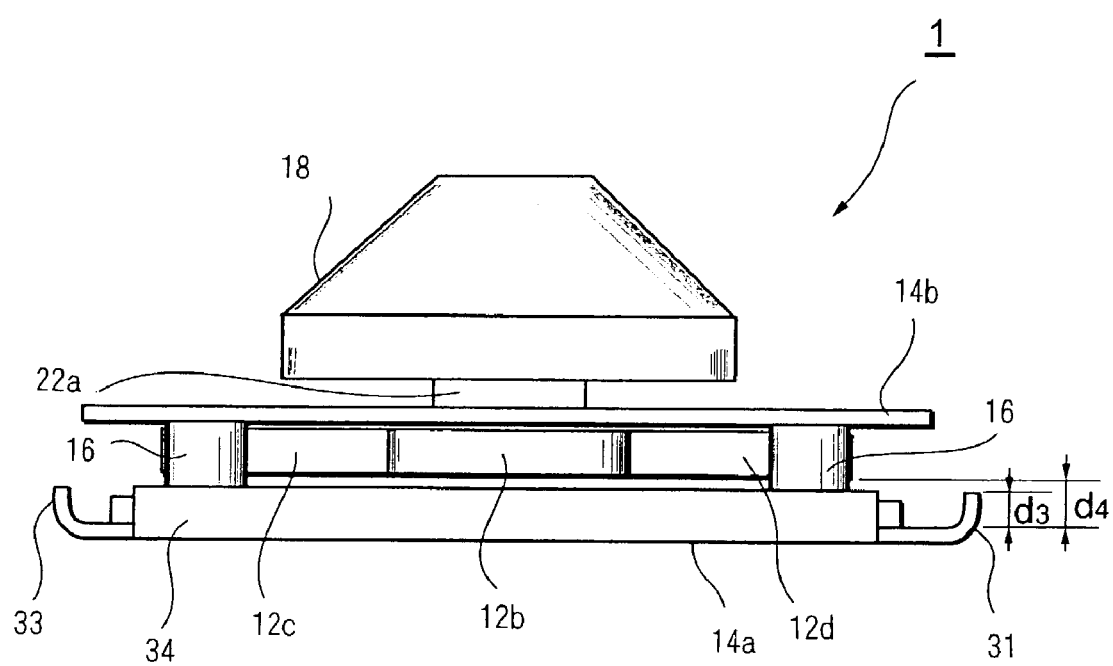
FIG. 12 is a side view of a magnetic actuator according to a second embodiment of the present invention.

FIG. 12 shows a side view of a magnetic actuator 1. In FIG. 12, the magnetic actuator 1 is seen in the Y-axis direction. As shown in FIG. 12, the magnetic actuator 1 according to the present embodiment is configured in such a manner that the height $d_3$ of the magnetic shielding units 31 to 34 from the second surface 30b of the first yoke plate 14a is smaller than the distance $d_4$ from the second surface 30b of the first yoke plate 14a to the coils 12a to 12d. Moreover, the studs 16 provided at four corners of the first yoke plate 14a each have one end thereof being fixed to the first yoke plate 14a, and another end thereof being fixed to the second yoke plate 14b, thereby fixing the first yoke plate 14a to the second yoke plate 14b.

The magnetic actuator 1 according to the present embodiment has the following advantage. A magnetic flux extending toward the side surface of the magnetic actuator 1 is shielded by the magnetic shielding units 31 to 34 provided on the peripheries of the second surface 30b of the first yoke plate 14a. Moreover, the magnetic actuator can be configured in such a manner that the magnetic shielding units 31 to 34 do not interfere the moving of the plurality of coils 12a to 12d and the connecting unit 22, because the magnetic shielding units 31 to 34 are provided on the second surface 30b. With this configuration, even if the size of the magnetic actuator is restricted when being accommodated into compact equipment, operable ranges of the plurality of coils 12a to 12d and the connecting unit 22 are not narrowed to any extent. By providing the first yoke plate 14a, the second yoke plate 14b, and the magnetic shielding units 31 to 34 in this manner, the leakage of the magnetic flux to the outside of the magnetic actuator can be reduced without narrowing the operable ranges of the plurality of coils 12a to 12d and the connecting unit 22 even if the size of the magnetic actuator is restricted.

In particular, because the leakage of the magnetic flux occurs in a larger quantity in such a position where a magnet is close to the end tip of the first yoke plate 14a, it may be advantageous if the length $d_1$ in the longitudinal direction of each the magnetic shielding units 31 to 34 is configured so as to be longer than the sum $d_2$ of the lengths of the sides, closest to the magnetic shielding unit, of the corresponding magnets. With such a configuration, the leakage of the magnetic flux to the outside from the magnetic actuator can be further reduced.

Furthermore, the magnetic actuator 1 according to the present embodiment is configured such that the height $d_3$ of the magnetic shielding units 31 to 34 from the second surface 30b is smaller than a distance $d_4$ from the second surface 30b to the plurality of coils 12a to 12d. The magnetic shielding units 31 to 34 are preferably configured in such a manner. Because such a configuration preferably realizes a configuration where the magnetic shielding units 31 to 34 do not interfere with the plurality of coils 12a to 12d, the leakage of the magnetic flux can be reduced without narrowing the operable ranges of the plurality of coils 12a to 12d even if the size of the magnetic actuator is restricted.

In addition, in the present embodiment, the magnetic shielding units 31 to 34 are formed by bending the ends of the first yoke plate 14a. If the magnetic shielding units 31 to 34 are formed in this manner, the manufacturing process thereof can be made simple and the magnetic shielding units can be easily provided. Moreover, because the number of parts is not increased, increase in cost by providing the magnetic shielding units 31 to 34 can be suppressed.

It should be noted that the weight of the magnetic shielding units 31 to 34 in the total weight of the first yoke plate 14a is minimal, and the overall size of the magnetic actuator can be unchanged even if the magnetic shielding units 31 to 34 are provided. Accordingly, by providing the magnetic shielding units 31 to 34, construction capable of reducing the leakage of the magnetic flux can be realized with minimal weight increase.

(Modification)

Figure 13:
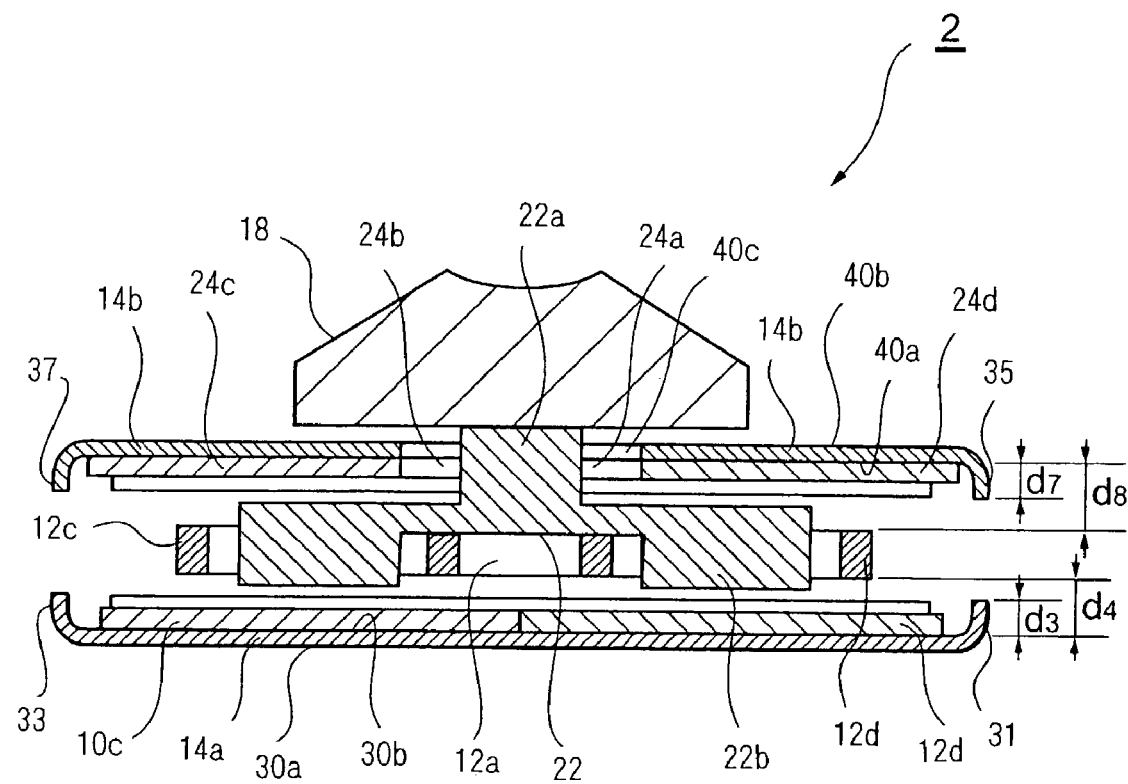
FIG. 13 is a cross-sectional side view showing the same cross-section as the I-I cross-section of the magnetic actuator shown in FIG. 8 according to one modification.
Figure 14:
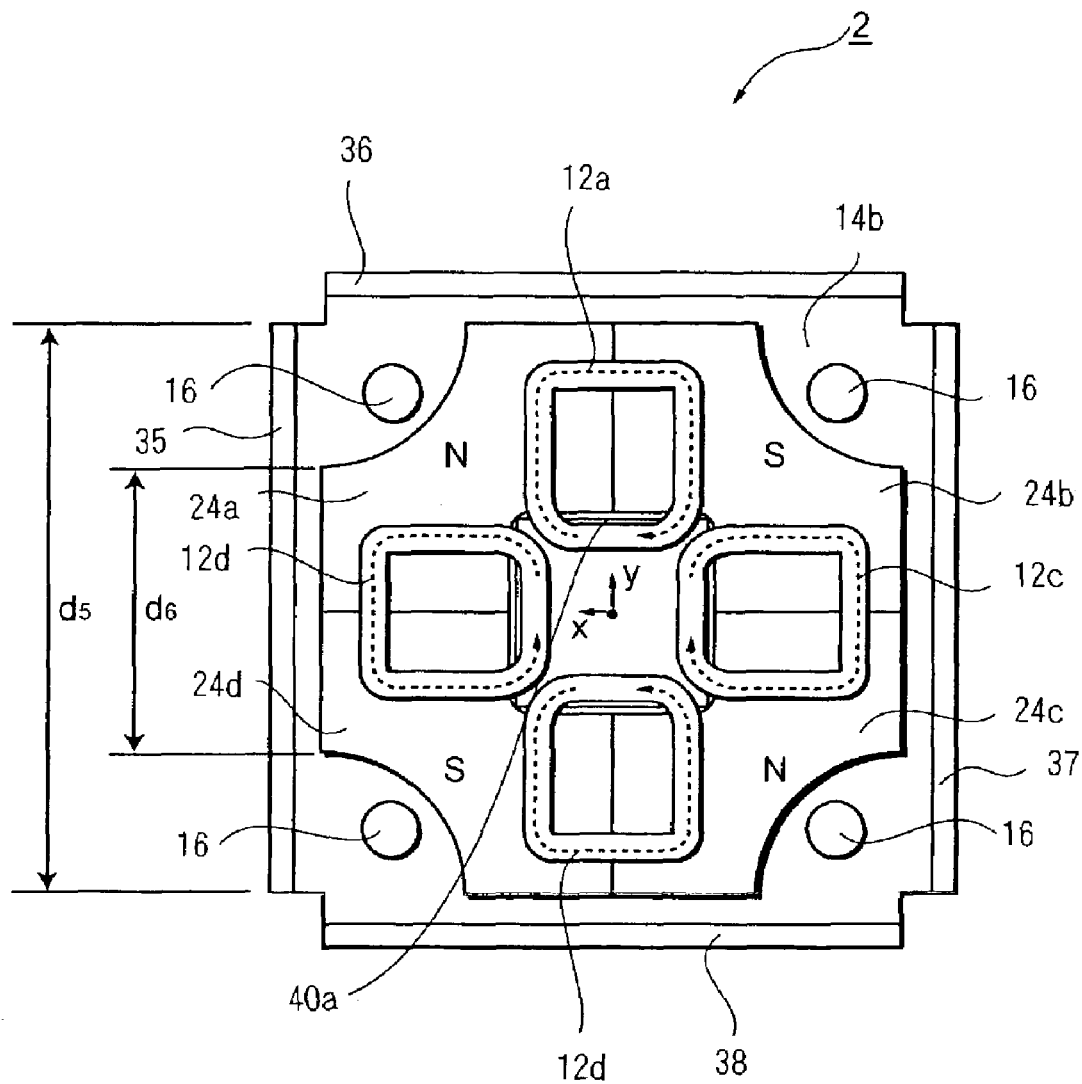
FIG. 14 is a bottom view showing a positional relationship between coils and magnets of a magnetic actuator according to one modification.

Now, a modification of the magnetic actuator according to the present invention will be described. A magnetic actuator 2 according to the present modification has the same outside appearance as the magnetic actuator 1 shown in FIG. 8. FIG. 13 is a cross-sectional side view showing the same cross-section as the I-I cross-section of the magnetic actuator 2 in FIG. 8. FIG. 14 is a bottom view showing a positional relationship between the coils 12a to 12d and the magnets 24a to 24d. In FIG. 14, the XYZ orthogonal coordinate system assumed in FIG. 11 is reused.

As shown in FIGS. 13 and 14, the magnetic actuator 2 comprises a first yoke plate 14a, a second yoke plate 14b, four magnets 10a to 10d, four coils 12a to 12d, a haptic sense presenting member 18, and a connecting unit 22.

The magnetic actuator 2 is provided with four magnets 24a to 24d. The magnets 24a to 24d are arranged in the same manner as in the first embodiment.

The first yoke plate 14a and the second yoke plate 14b are provided with magnetic shielding units 31 to 34 and the magnetic shielding units 35 to 38, respectively. The configuration of the magnetic shielding units 31 to 34 is the same as that of the second embodiment. The magnetic shielding units 35 to 38 are provided on peripheries of the third surface 40a of the second yoke plate 14b. The magnetic shielding units 35 to 38 are formed by bending the ends of the second yoke plate 14b toward the third surface 40a in the same manner as the magnetic shielding units 31 to 34. The magnetic shielding units 35 to 38 are bent substantially at right angles relative to the second yoke plate 14b, and the height thereof from the third surface 40a of the second yoke plate 14b is such that the magnetic shielding units 35 to 38 have substantially the same height. The magnetic actuator 2 according to the present modification is configured such that the height $d_7$ of the magnetic shielding units 35 to 38 from the third surface 40a of the second yoke plate 14b is smaller than the distance $d_8$ from the third surface 40a of the second yoke plate 14b to the coils 12a to 12d.

FIG. 14 shows that the magnetic shielding units 35 to 38 are provided on peripheries of the second yoke plate 14b. The magnetic shielding unit 35 and the magnetic shielding unit 37 are provided such that the longitudinal directions thereof are substantially in parallel with each other. The magnetic shielding unit 36 and the magnetic shielding unit 38 are provided such that the longitudinal directions thereof are substantially in parallel with each other, and the longitudinal directions thereof are substantially in the right angle with the longitudinal directions of the magnetic shielding unit 35 and the magnetic shielding unit 37. Furthermore, the magnetic shielding unit 35 is configured such that the length $d_5$ in the longitudinal direction of the magnetic shielding unit 35 is longer than the sum $d_6$ of the lengths of the sides, closest to the magnetic shielding unit 35, of the magnet 24a and the magnet 24d, respectively. This configuration is also applied to the configurations between the magnetic shielding unit 36 and the magnets 24a and 24b, the magnetic shielding unit 37 and the magnets 24b and 24c, and the magnetic shielding unit 38 and the magnets 24c and 24d, respectively.

The magnetic actuator 2 according to the present modification has the following advantage. The magnetic flux extending toward the side surface of the magnetic actuator 2 is shielded by the magnetic shielding units 31 to 34 provided on the peripheries of the second surface 30b of the first yoke plate 14a, and the magnetic shielding units 35 to 38 provided on the peripheries of the third surface 40a of the second yoke plate 14b. In addition, the magnetic shielding units 31 to 34 are provided on the second surface 30b, and the magnetic shielding units 35 to 38 are provided on the third surface 40a, thereby a magnetic actuator can be configured such that the magnetic shielding units 31 to 34 and 35 to 38 do not interfere with the plurality of coils 12a to 12d and the connecting unit 22. With such a configuration, even if the size of the magnetic actuator is restricted when being accommodated into compact equipment, the operable ranges of the plurality of coils 12a to 12d and the connecting unit 22 are not narrowed to any extent. As described above, according to the magnetic actuator of the present modification, the leakage of magnetic flux to the outside of the magnetic actuator can be reduced without narrowing the operable ranges of the plurality of coils 12a to 12d and the connecting unit 22, even if the size of the magnetic actuator is restricted.

It should be noted that the magnetic actuator may have a configuration without the magnetic shielding units 31 to 34, and by being provided with the first yoke plate 14a, the second yoke plate 14b, and the magnetic shielding units 35 to 38, the leakage of the magnetic flux to the outside of the magnetic actuator can be reduced without narrowing the operable ranges of the plurality of coils 12a to 12d and the connecting unit 22 even if the size of the actuator is restricted.

Moreover, in the magnetic actuator 2 according to the present modification, the height $d_3$ of the magnetic shielding units 31 to 34 from the second surface 30b is smaller than the distance $d_4$ from the second surface 30b to the plurality of coils 12a to 12d. Furthermore, the height $d_7$ of the magnetic shielding units 35 to 38 from the third surface 40a is smaller than the distance $d_8$ from the third surface 40a to the plurality of coils 12a to 12d. The magnetic shielding units 31 to 34 and the magnetic shielding units 35 to 38 are preferably configured in this manner, thereby giving a configuration in which the magnetic shielding units 31 to 34 and 35 to 38 do not interfere with the plurality of coils 12a to 12d, and thus the leakage of the magnetic flux can be reduced without narrowing the operable ranges of the plurality of coils 12a to 12d even if the size of the magnetic actuator is restricted.

EXAMPLE

Here, an example of a magnetic actuator according to the present invention will be described. The example is that of the second embodiment described above. In the example, the height $d_3$ of the magnetic shielding units 31 to 34 is varied by one quarter of the thickness of the magnets 10a to 10d until the height $d_3$ becomes equal to the thickness of the magnets 10a to 10d, and the magnetic flux leaked to the outside of the magnetic actuator is measured. There, the leakage of the magnetic flux at a position 5 mm apart from the side surface of the magnetic actuator is evaluated.

Figure 15:
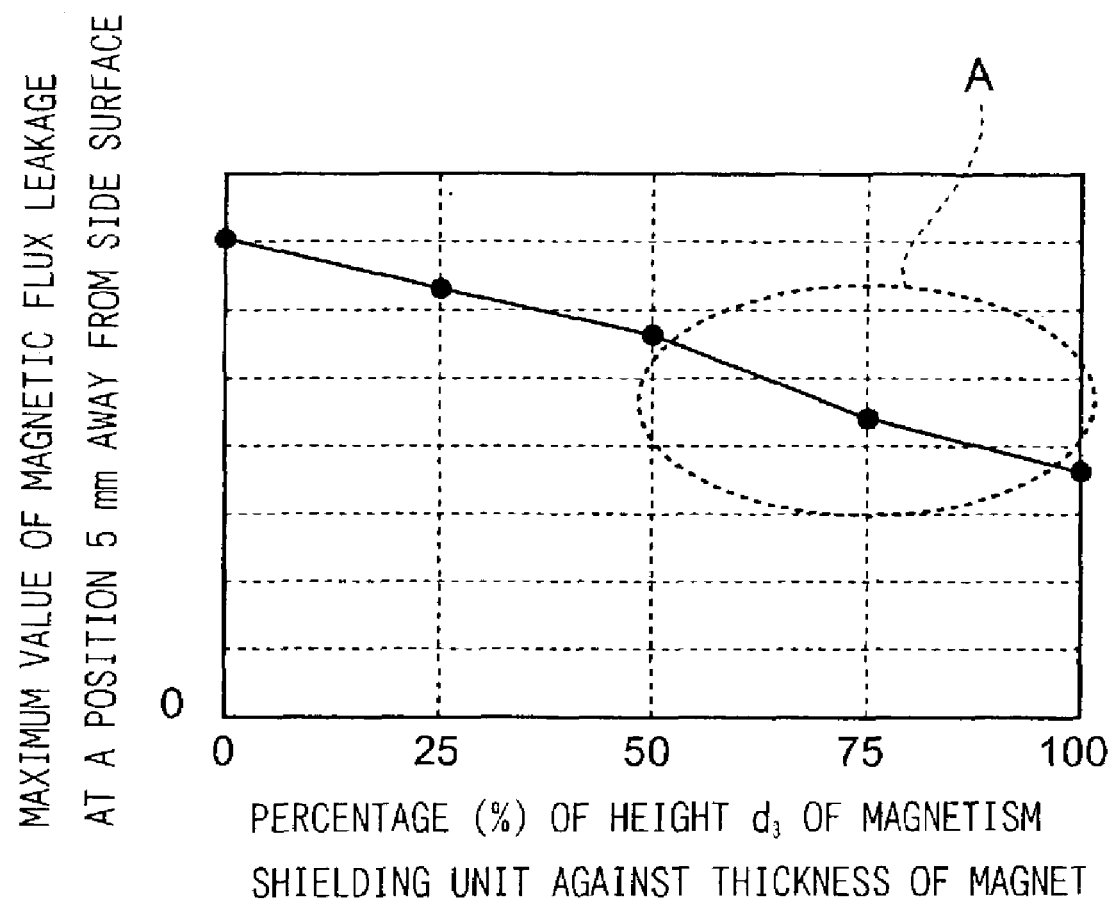
FIG. 15 shows a graph in which leakage of magnetic flux from a magnetic actuator is evaluated in a second embodiment of the present invention.
Figure 16A:
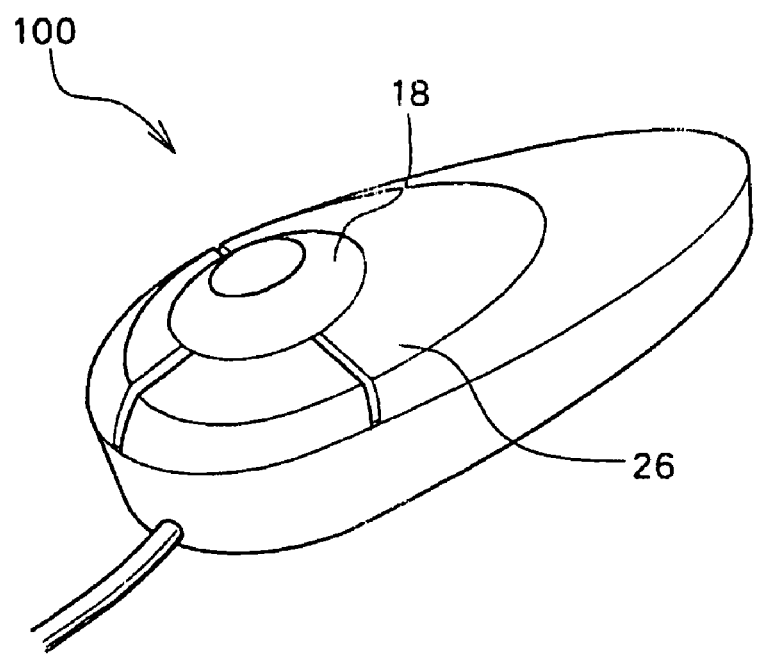
FIG. 16A is a view showing external appearance and a use mode of a haptic sense presenting device incorporating a magnetic actuator.
Figure 16B:
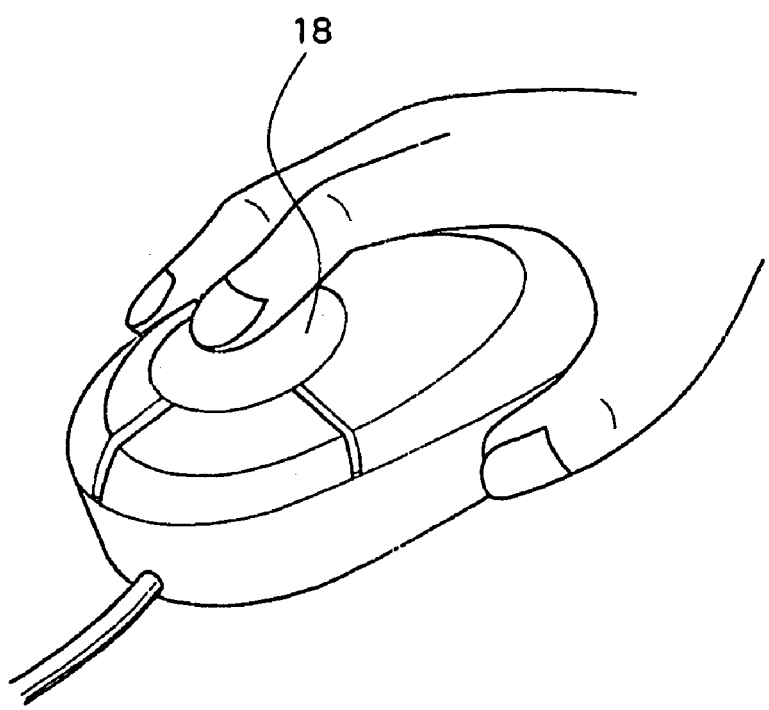
FIG. 16B is a view showing an example where the haptic sense presenting device incorporating the magnetic actuator is used.
Figure 17:
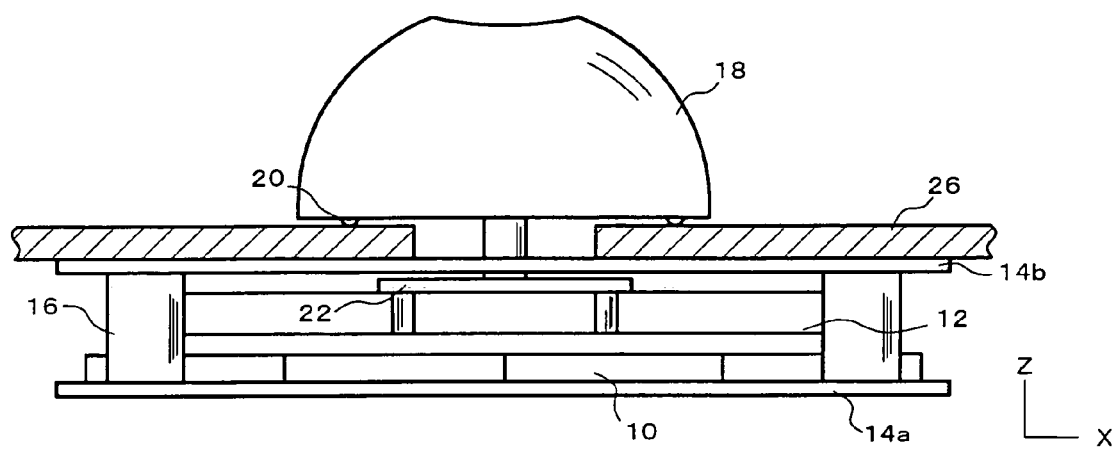
FIG. 17 is a side view showing a configuration of a magnetic actuator according to one related art.
Figure 18:
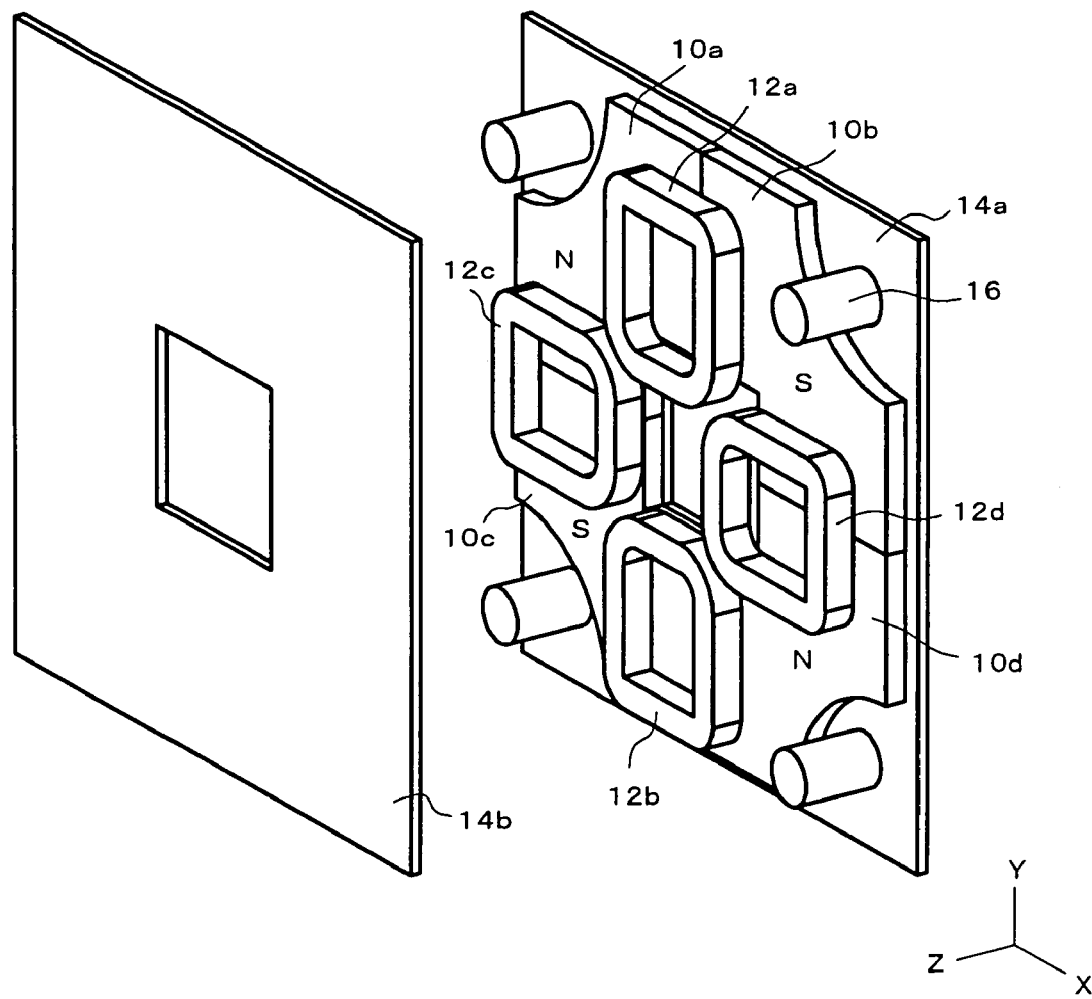
FIG. 18 is an exploded perspective view of the major portion of a magnetic actuator according to one related art.
Figure 19:
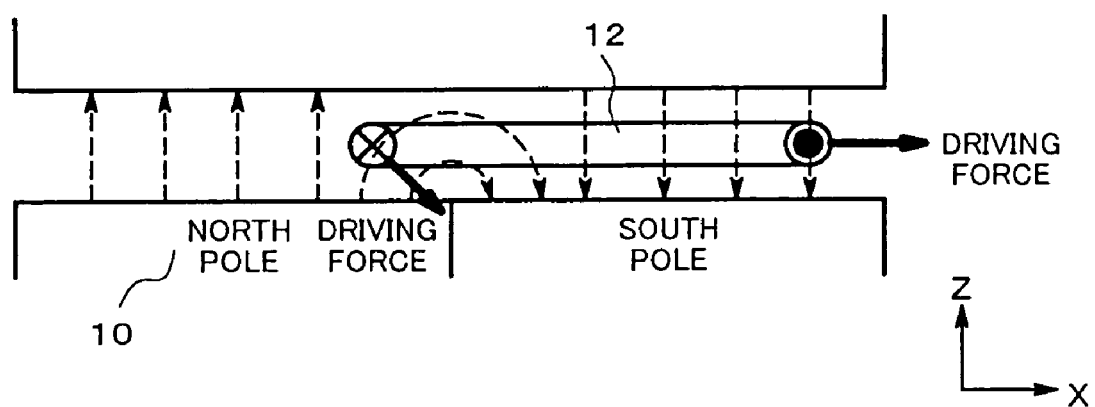
FIG. 19 is a view explaining a driving force generated in a plane coil of a magnetic actuator according to one related art example.

FIG. 15 is a graph evaluating the leakage of the magnetic flux from a magnetic actuator. The graph shown in FIG. 15 represents, on the horizontal axis, the ratio in percentage of the height $d_3$ of the magnetic shielding units 31 to 34 relative to the thickness of the magnets 10a to 10d. The vertical axis of the graph represents the maximum value of the leakage of the magnetic flux at a position 5 mm apart from the side surface of the magnetic actuator.

In the graph shown in FIG. 15, the maximum value of the leakage of the magnetic flux from the side surface of the magnetic actuator is reduced with increase of the height $d_3$ of the magnetic shielding units 31 to 34. In particular, it is understood that a high effect of the reduction of the leakage of the magnetic flux from the side surface of the magnetic actuator is realized when the height $d_3$ of the magnetic shielding units 31 to 34 is made 50 to 100% of the thickness of the magnets 10a to 10d (A in FIG. 15). It is also understood that, with the magnetic actuator in which the height $d_3$ of the magnetic shielding units 31 to 34 is made equal to the height of the magnets (100%), the maximum value of the leakage of the magnetic flux is reduced to approximately one half, in comparison with that of a magnetic actuator in which the height of the magnetic shielding units 31 to 34 is 0%, namely the magnetic actuator without the magnetic shielding unit.

The magnetic actuator according to the present invention is not limited to the above-described respective embodiments, and various modifications are possible. For example, a magnetic shielding unit may be configured by use of a magnetic substance other than the first yoke plate and the second yoke plate, in addition to formation by bending the ends of the first yoke plate and the second yoke plate. As an example, slender square pillow shaped magnetic substance may be provided as a magnetic shielding unit on a second surface or a third surface so as to run along four sides of a first yoke plate or a second yoke plate, as a result of which the leakage of the magnetic flux to the outside can be reduced without narrowing the operable ranges of a plurality of coils and a connecting unit even if the size of the magnetic actuator is restricted. The applications, Japanese Patent Application Nos. 2002-273575 and 2002-275994 from which priorities are claimed are incorporated herein by reference.

What is claimed is:

1. A magnetic actuator, comprising:
 a magnet, with mutually opposite magnetic poles thereof being arranged opposing each other, wherein the magnet includes:
 a first magnet array including a plurality of sub-magnets radially juxtaposed with each other in plan view around a central point, the sub-magnets encircling the central point, and traveling around the central point, the sub-magnets are alternately magnetized into at least four opposite magnetic poles such that each sub-magnet is disposed between two other sub-magnets having polarities opposite to a polarity of the sub-magnet, the magnetic poles directed in a direction perpendicular to the plan view, and
 a second magnet array arranged opposing the first magnet array, the second magnet array including a plurality of sub-magnets radially juxtaposed with each other in plan view around a central point, the sub-magnets encircling the central point, and traveling around the central point, the sub-magnets are alternately magnetized into at least four opposite magnetic poles such that each sub-magnet is disposed between two other sub-magnets having polarities opposite to a polarity of the sub-magnet, the magnetic poles directed in a direction perpendicular to the plan view and being magnetized such that respectively opposite magnetic poles thereof are opposed to the respectively opposite magnetic poles of the first magnet array, and
 at least one coil, having at least one portion thereof inserted between corresponding magnetic poles, the coil movably arranged so that the coil may be driven parallel to the plan view along a straight line;
 wherein a driving force for the coil is obtained by applying an electric current to the coil in a magnetic field generated by the magnet.

2. A magnetic actuator according to claim 1, wherein a distance between the opposed magnetic poles is one half or less of the square root of the area of the opposed magnetic poles.

3. A haptic sense presenting device for giving a stimulus to a haptic sense of an animal,
 wherein the haptic sense presenting device comprises a magnetic actuator, comprising:
 a magnet, with mutually opposite magnetic poles thereof being arranged opposing each other, wherein the magnet includes,
 a first magnet array including a plurality of sub-magnets radially juxtaposed with each other in plan view around a central point, the sub-magnets encircling the central point, and traveling around the central point, the sub-magnets are alternately magnetized into at least four opposite magnetic poles such that each sub-magnet is disposed between two other sub-magnets having polarities opposite to a polarity of the sub-magnet, the magnetic poles directed in a direction perpendicular to the plan view, and
 a second magnet array arranged opposing the first magnet array, the second magnet array including a plurality of sub-magnets radially juxtaposed with each other in plan view around a central point, the sub-magnets encircling the central point, and traveling around the central point, the sub-magnets are alternately magnetized into at least four opposite magnetic poles such that each sub-magnet is disposed between two other sub-magnets having polarities opposite to a polarity of the sub-magnet, the magnetic poles directed in a direction perpendicular to the plan view and being magnetized such that respectively opposite magnetic poles thereof are opposed to the respectively opposite magnetic poles of the first magnet array, and at least one coil, having at least one portion thereof inserted between corresponding magnetic poles, the coil movably arranged so that the coil may be driven parallel to the plan view along a straight line;

wherein a driving force for the coil is obtained by applying an electric current to the coil in a magnetic field generated by the magnet.

4. A magnetic actuator, comprising:

a substantially flat-plate shaped first yoke plate having a first surface and a second surface, a substantially flat-plate shaped second yoke plate having a third surface and a fourth surface, wherein the third surface is provided so as to oppose the second surface of the first yoke plate, a plurality of magnets including a plurality of sub-magnets radially juxtaposed with each other in plan view around a central point, the sub-magnets encircling the central point, and traveling around the central point, the sub-magnets are alternately magnetized into at least four opposite magnetic poles such that each sub-magnet is disposed between two other sub-magnets having polarities opposite to a polarity of the sub-magnet, the magnetic poles directed in a direction perpendicular to the plan view, the plurality of magnets provided fixed to the second surface of the first yoke plate, a plurality of coils provided substantially in parallel with the third surface of the second yoke plate between the plurality of magnets and the second yoke plate, the coils movably arranged so that the coils may be driven parallel to the plan view along a straight line;

a connecting unit for integrally fixing the plurality of coils, arranged concentrically with the plurality of coils, and a magnetic shielding unit comprising magnetic substance provided on both or either of peripheries of the second surface of the first yoke plate and/or the third surface of the second yoke plate, wherein the magnetic shielding unit is provided on a periphery of the second surface of the first yoke plate, and the height of the magnetic shielding unit from the second surface is smaller than a distance from the second surface to the plurality of coils.

5. A magnetic actuator according to claim 4, further comprising:

a plurality of magnets provided fixed to the third surface of the second yoke plate.

6. A magnetic actuator according to claim 4, wherein the magnetic shielding unit is provided on a periphery of the third surface of the second yoke plate, and the height of the magnetic shielding unit from the third surface is smaller than a distance from the third surface to the plurality of coils.

7. A magnetic actuator according to claim 4, wherein the magnetic shielding unit is formed by bending an end of the first yoke plate or the second yoke plate.

8. A magnetic actuator, comprising:

a magnet including a sub-magnet juxtaposed therewith in plan view and alternately magnetized into at least four opposite magnetic poles being arranged around a central point, the poles encircling the central point such that each pole is disposed between two other poles having polarities opposite to a polarity of the pole, the magnetic poles directed in a direction perpendicular to the plan view;

at least one coil, having at least one portion thereof inserted between corresponding magnetic poles; and a transmitting unit that transmits actuation to a user, the transmitting unit being co-axially connected to an actuation part by a connecting unit and being provided movably by a sliding unit, the actuation part having the coil;

wherein a magnetic field is generated by applying an electric current to the coil.

9. The magnetic actuator according to claim 8, the magnet further comprising:

a first magnet array including a plurality of sub-magnets juxtaposed with each other in plan view and alternately magnetized into opposite magnetic poles, and a second magnet array arranged opposing the first magnet array, the second magnet array including a plurality of sub-magnets juxtaposed with each other in plan view and being magnetized such that respectively opposite magnetic poles thereof are opposed to the respectively opposite magnetic poles of the first magnet array.

10. The magnetic actuator according to claim 9, wherein the sub-magnets are alternately magnetized into at least four opposite magnetic poles.

* * * * *